Oct. 12, 1943.   F. B. LACHLE   2,331,785
OIL EXTRACTION
Filed July 1, 1940
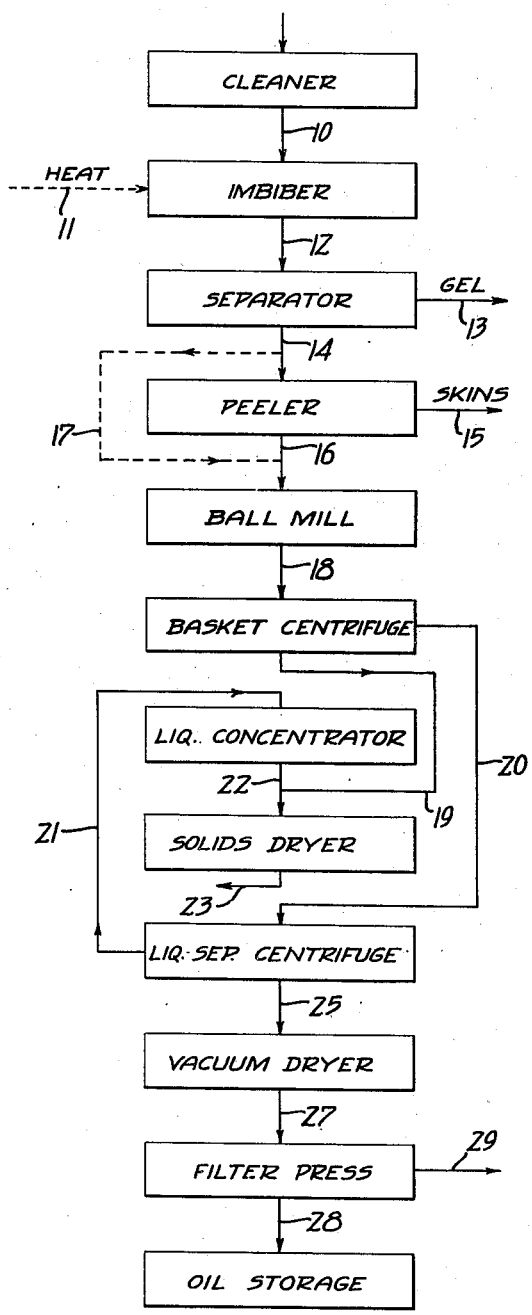
INVENTOR
FRANK B. LACHLE
BY Harper Allen
ATTORNEY Patented Oct. 12, 1943

2,331,785

UNITED STATES PATENT OFFICE 2,331,785

OIL EXTRACTION

Frank B. Lachle, San Mateo, Calif., assignor to The Schwarz Engineering Company, Inc., San Francisco, Calif., a corporation of Nevada Application July 1, 1940, Serial No. 343,335

3 Claims. (Cl. 260—412.2)

This invention relates to the field of oil extraction, and is concerned more particularly with the provision of an improved oil extracting process for use with oil-bearing materials of cellular character, which materials also contain a gel or gelatinous substance which tends to interfere with the oil extracting operation.

It is an object of the invention to provide an improved process of extracting oil from cellular oil-bearing materials which also contain gelatinous matter.

Another object of the invention is to provide an improved process of treating oil-bearing materials of cellular character to remove any gelatinous matter before the oil extraction step.

Another object of the invention is to provide an improved process of treating oil-bearing materials of a cellular character to remove undesirable constituents before the oil extraction step.

Other objects and advantages of the invention will be apparent from the following description of a preferred method of performing the invention, which is illustrated schematically in the accompanying drawing, in which: The figure illustrates a typical flow diagram for carrying out the process disclosed herein:

The present invention relates to the general type of oil extraction process which is described and claimed in my co-pending application, Serial No. 341,175, filed June 18, 1940, for "Oil extraction." As explained in said application, the general process, which may be termed a wet process, contemplates the dispersion of the material in a liquid medium so that the individual cells are separated to provide for wetting of each cell by the medium as it is separated and to provide for individual treatment of each cell whereby it is crushed or ruptured to have the oil displaced therefrom, or whereby the oil is expelled or expressed through the natural pores of the cell. To effect this result, point pressure is applied to each of the individual oil cells or oil cell groups in the presence of a non-oil-soluble oil-carrying medium, such as water or an aqueous solution. The result preferably is obtained by providing a treating zone filled or partly filled with a displacing medium in which a multitude of point pressure effects are provided repeatedly and successively so that after a period of treatment the mass of material is delaminated to free the individual cells or cell groups and each individual oil cell is free for separate treatment. The point pressure referred to is that provided by surfaces having multitudinous minute asperities of such dimensions as to allow the asperities to practically or actually touch or rub each other so that the oil cell is pressed, cut, broken, squeezed or crushed between pressure surfaces having dimensions in the order of, or less than, the oil cell dimensions. Various surfaces providing a satisfactory type of asperity are referred to hereinafter. The point pressure effect is continued for a period of time sufficient to eliminate or substantially eliminate the oil cell groups and provide a slurry or puree containing individual oil cells and the oil-displacing medium. The same point pressure effect used for delamination is also used to rupture or macerate the oil cells to liberate the oil and allow it to be carried away by the oil-carrying medium or to effect displacement of the oil through the pores of the cells by the application of pressure to the individual cell.

In this way, substantially all of the oil-bearing cells can be treated, and the percentage of oil recovery from various substances can be materially increased. At the same time the process lends itself to the direct production of a crude oil having certain or substantially all of the characteristics of refined oil. In many instances, the crude oil recovered in accordance with this invention needs only certain finishing steps, such as deodorization or clarification, to compare favorably with refined oils which are treated by known processes.

Certain of the oil-bearing materials such as linseed, for example, contain a gel or gelatinous constituent which tends to interfere with, and prevent, efficient oil extraction. This is believed to occur because the gel is in the nature of a pseudo-emulsifying agent and actually forms one phase of an emulsification which prevents coalescence of the minute droplets of oil. It is desirable, therefore, that the gel constituents be removed before the oil extraction step.

In carrying out the process, the linseed, for example, is first cleaned to remove extraneous trash and foreign matter and is then conveyed as indicated by the line 10 to an imbiber where it is treated in water or an aqueous solution to dissolve out substantially all of the gel constituents, which are believed to be in the linseed skin. Usually, as explained, heat will be applied as indicated by the arrow 11 to hasten the removal of the gel. Usually the treatment will be carried out by boiling the linseed in water, although if desired, a longer soaking period may be employed to dissolve out the gel constituents in cold or lukewarm water.

From the imbiber, the linseed and the dissolved gel which is now in the form of a jelly or psuedo-solution is fed as indicated by the line 12 to a suitable form of separator which serves to separate the seeds from the gelatinous material. For example, the material may be fed to a pressure screening device wherein the gelatinous material would be forced through the screen while the seeds or oil-bearing portion of the material would be caught and retained by the screen. After separation the gel is led to a suitable point of disposal as indicated by the line 13, while the feeding of the degelatinized or gel-free linseed from the separator to a peeler is indicated by the line 14.

The peeler may be of any suitable form of construction to remove the skins from the seed, but I prefer to use a centrifugal comminutor of the type having one or more sets of comminuting teeth with a corresponding number of screens past which the comminuted material is fed while under the influence of centrifugal force. Such machines also can be adjusted as to the degree of grinding and as to the rate of feed past the screen and the pressure on the material at the screen. The material is moistened before grinding so that the solids are wetted with water before any oil is liberated during grinding and to facilitate the grinding operation. With this character of comminution the softer oil-containing meats are finely divided while the harder skin is left in larger pieces so that the finely divided meats can be passed or forced through a screen under pressure while the skins are fed over and past the screen to a separate point of discharge. Machines of this character are disclosed in the co-pending applications of Henry G. Schwarz, Serial No. 54,795, filed December 17, 1935, and Serial No. 319,292, filed February 16, 1940.

As indicated by the line 15, the skins are fed to a suitable point of disposal while the oil bearing portion of the linseed is fed as indicated by the line 16 to a ball mill. As indicated by the dotted line 17, the peeler may be by-passed and the linseed fed with their skins directly from the separator to the ball mill.

After the pre-treatment is completed, where required, the oil-bearing material is placed in a treating chamber which contains a non-oil-soluble oil-carrying or oil-displacing medium, such as water, and means for first delaminating or disintegrating the material to individual cells or cell groups to provide a dispersion of the individual cells or cell groups in the medium and then for treating the cells individually or while in a layer of approximately cellular thickness. Both the delamination and the subsequent pressure treatment of the cells is preferably effected by means of a multitudinous point pressure effect. Throughout the reduction and treatment, the non-oil-soluble oil-carrying medium should be present in at least sufficient quantity to wet all of the solids of the oil-bearing material in all portions of the treating chamber and not in excess of the amount required for efficient operation. The desired amount of medium provides a complete dispersion of the oil-bearing material in the medium so that the individual cells or cell groups composed of two or more cells are completely surrounded and wetted by the medium. After the treatment is finished the oil-solids-water slurry or puree is usually of the consistency of cream.

Generally, it may be stated that the treatment of the material in cellular or small multi-cellular particles in a dispersed form in a non-oil-soluble oil-carrying medium is of a character to extract some of the oil by actual rupturing or breaking of the cells to liberate the oil in the medium; some of the oil may be displaced by osmosis; and other portions of the oil will be liberated by complete or partial collapse of the cell walls without rupture. The combined effect of the various types of extraction is to recover a high percentage of the oil present in the material.

The means for providing a multitudinous point pressure effect in the treating chamber may take the form of usual surfaces available, such as metal or porcelain, which have a character of minute roughness (even though they may be apparently smooth) to approximate cellular dimensions. Preferably, the pressure surfaces are provided on a plurality of small pressure elements such as balls, pebbles, rods, discs, cubes, rolls or plates and the like, which are loosely confined in a treating chamber and subjected to agitation or vibration so as to repeatedly contact each other. This type of action is provided, for example, by the cascading and sliding action of the pressure elements such as found in a ball mill of conventional design. For certain applications, other equipment for producing individual pressure treatment of the cells, such as a hammer mill or a colloid mill, may be employed.

After the ball mill treatment, the entire constituents of the slurry including solids, water, water-solubles, and oil, are discharged as indicated by the line 18 into a basket centrifuge which serves to separate the solids from the water and oil. The solids from the basket centrifuge may be fed as indicated by the line 19 to the solids dryer, while the mixture of oil and water, as indicated by the line 20, is carried to a liquid separator centrifuge where the oil is separated from the water. The water containing the water solubles may be fed from the centrifuge, as indicated by the line 21, back to the liquid concentrator where it may be concentrated sufficiently for drying, and fed, as indicated by the line 22, to the solids dryer. The dried solids may be carried away as indicated by the line 23 to any suitable point of disposal.

The oil from the liquid separator centrifuge is still wet and may be conveyed as indicated by the solid line 25 to a vacuum dryer. The dry cloudy oil from the vacuum dryer is fed as indicated by the line 27 to a filter press of suitable construction from which the dry brilliant oil is conveyed as indicated by the line 28 to a suitable place of oil storage. The press-cake may be discharged as indicated by the line 29 to a suitable point of disposal.

In a typical run with linseed, after cleaning, the linseed was boiled in water for about fifteen minutes to dissolve out the gelatinous constituent of the skins. Then, the seed and gel were separated by screening and the seeds fed to a ball mill. The ball mill was also supplied with water in a proportion of about 100% of the weight of the seeds on a dry basis. The ball mill was operated for about 1½ to 3 hours to delaminate the material to cellular form and liberate the oil from the oil cells. Subsequently, the liberated oil was recovered by centrifugal separation. Where the skins are removed before the ball mill treatment, the treatment is shorter and may be carried out in from thirty to sixty minutes.

I claim:

1. An oil extraction process for cellular oil-bearing materials having gelatinous constituents which includes the steps of first subjecting the material to an aqueous solution to dissolve out the gelatinous constituents, then separating out the gelatinous constituents to provide a gel-free oil-bearing residue, and thereafter reducing such residue to substantially cellular form in an aqueous solution and liberating the oil from the individual oil cells by application of a point pressure effect of the type provided by a ball mill.

2. An oil extraction process for cellular oil-bearing materials having gelatinous constituents which includes the steps of first subjecting the material to the action of a hot aqueous solution to dissolve out the gelatinous constituents, then separating out the gelatinous constituents to provide a gel-free oil-bearing residue, and then subjecting the oil-bearing residue to a ball mill effect in the presence of an aqueous agent to reduce the residue to substantially cellular form and to liberate the oil from the oil cells.

3. An oil extraction process for cellular oil-bearing materials having gelatinous constituents and skins which includes the steps of first subjecting the material to an aqueous solution to dissolve out the gelatinous constituents, then separating out the gelatinous constituents to provide a gel-free oil-bearing residue, removing the skins from the residue, and thereafter reducing such residue to substantially cellular form in an aqueous solution and liberating the oil from the individual oil cells by application of a multitudinous point pressure effect of the type provided by a ball mill.

FRANK B. LACHLE.